July 18, 1939.   W. H. SHAW   2,166,224
TOBACCO POUCH
Filed Sept. 12, 1936
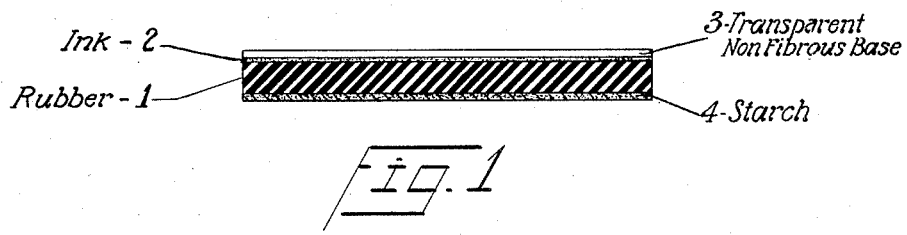
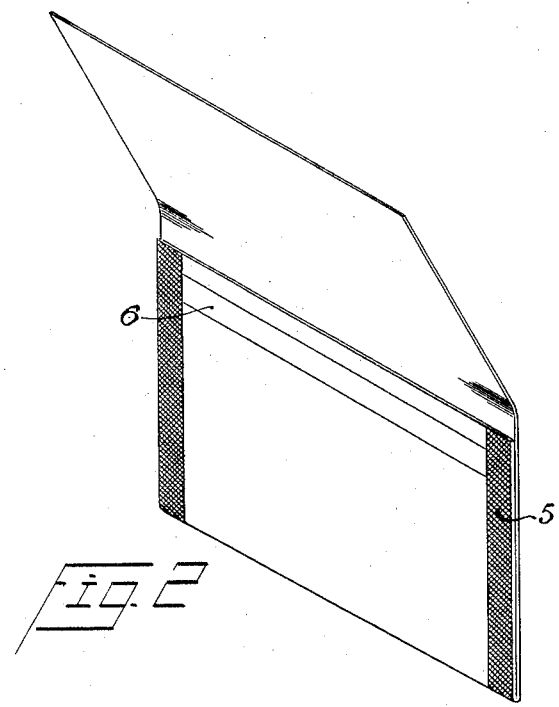
William H. Shaw   INVENTOR
BY
Frank C. Hilberg
ATTORNEY Patented July 18, 1939

2,166,224

UNITED STATES PATENT OFFICE 2,166,224

TOBACCO POUCH

William Henry Shaw, Mimico, Ontario, Canada, assignor to E. I. du Pont de Nemours & Company, Wilmington, Del., a corporation of Delaware Application September 12, 1936, Serial No. 100,454

5 Claims. (Cl. 229—3.5)

This invention relates to the preparation of laminated material and more particularly to the preparation of laminated material in which a flexible non-fibrous transparent film of cellulosic material is firmly united to a substantial layer of rubber composition, and the use of this material in the preparation of containers.

Heretofore, it has been common practice to unite cloth, paper, and similar fibrous materials to a layer of rubber and subsequently vulcanizing the material with the result that the two layers are inseparable. The preparation of laminated material of this type is commonly practiced and presents no serious problem since paper and cloth are porous and the raw rubber is easily forced into the interstices of the fabric so that the fibers are embedded in the rubber. Upon vulcanization, the components of the laminated material are integrally united.

With the widespread use of regenerated cellulose sheet material such as that sold under the trade mark "Cellophane", and cast cellulose derivative films, it has been found desirable to laminate such films with rubber. However, due to the great difference in the physical and chemical properties of the two materials, no satisfactory method has heretofore been found for uniting such materials where the bond between the two has been at all substantial.

This invention has as an object the provision of a method of producing laminated material in which a dense, non-fibrous layer of cellulosic material is intimately joined to a substantial layer of uncured rubber composition as distinguished from a thin application of pure rubber cement.

Another object of this invention is the provision of laminated material in which a dense non-fibrous layer of cellulosic material is joined to a substantial layer of rubber by means of an intermediate adhesive film.

A still further object of this invention is the provision of a method of preparing a container from a laminated material having a layer of uncured rubber composition intimately joined to an ornamentally printed transparent cellulosic sheet.

These objects are accomplished by printing or otherwise applying a thin film of a suitable composition to a transparent sheet and subsequently applying thereto a layer of rubber composition.

In the drawing, Figure 1 represents a diagrammatic section through a portion of the laminated material, Figure 2 represents a pouch prepared from such material. In Figure 1, the rubber composition is indicated as 1, the ink shown as 2, and the transparent non-fibrous base is indicated as 3. A surface layer of starch is shown as 4. In Figure 2, 5 represents an area which has been permanently sealed together by applying pressure to the designated area with a knurled rotating wheel or press (not shown). A temporary seal for keeping the contents of the container in an airtight condition may be obtained by applying pressure at any convenient zone such as that represented by 6.

In carrying out the invention, a flexible film such as regenerated cellulose is printed with an oil-type ink over substantially its entire area and when the ink is dry, a layer of uncured rubber composition is calendered onto the sheet in contact with the ink.

While regenerated cellulose either plain or moistureproof is preferred as the transparent sheet material, other transparent films such as those prepared from rubber derivatives such as chlorinated, polymerized, or hydrogenated rubber, or rubber hydrochloride may be used. Cellulose derivative films such as cellulose nitrate, cellulose acetate, or cellulose ethers such as ethyl cellulose, and benzyl cellulose may also be used. It has also been found that suitable films may be prepared from cellulose derivatives cast from aqueous or alcohol dispersions such as glycol cellulose, cellulose glycolic acid and lower etherified or esterified celluloses. In fact, the invention relates to the use of practically any transparent film which retains its transparency and flexibility and is resistant to abrasion for an extended period of time.

The following compositions illustrate typical oil-varnish inks which have been found satisfactory:

Example 1

| | Per cent |
|---|---|
| Wachtung Red Lake | 39.63 |
| Litho transparent #1 linseed oil varnish | 59.50 |
| Cobalt lineolate paste (5.6% cobalt) | 0.87 |
| | 100.00 |

Example 2

| | Per cent |
|---|---|
| Wachtung Red Lake | 35.67 |
| Litho transparent #1 linseed oil varnish | 53.40 |
| Cobalt lineolate paste (5.6% cobalt) | 0.78 |
| Ester gum | 10.15 |
| | 100.00 |

The invention is not limited to the specific oil varnish inks given above since these compositions may be varied greatly both with respect to amounts and ingredients.

After the ink has been applied to the transparent sheet and allowed to dry, a substantial coat of uncured rubber composition is calendered onto the sheet. The rubber composition is preferably prepared according to the method disclosed in the application of Shaw & Moriarty, Serial No. 724,724, filed May 9, 1934, now Patent No. 2,046,975. The following example illustrates a satisfactory composition:

| | |
|---|---|
| Pale crepe _____ pounds__ | 38 |
| Whiting _____ do____ | 20 |
| Barytes_____ do____ | 42 |
| Zinc oxide _____ do____ | 5 |
| Montan wax _____ do____ | 2 |
| Rubber oil _____ do____ | 2 |
| Stearic acid _____ ounces__ | 6 |

This compound may be modified in various ways that will be apparent to those skilled in the art as by adding coloring matter or essences, or in the use of other waxes and other types of rubber such as balata or synthetic rubber substitutes, for example, that known as Neoprene. Satisfactory results have been obtained by applying the above composition to the extent of about 6 oz. per sq. yd.

After the laminated material leaves the calender rolls, it is subjected to a starching and brushing operation. The application of starch may be done by the use of a starching box such as those well known in the art or by any other means which will deposit a thin film of starch whether done by machinery or by hand. After the starching has been applied and the excess removed, the fabric is wound onto a roll in which condition it may be stored until ready for use.

The purpose of the starch is to form a non-sticky surface on the rubber side of the material. The rubber composition and the amount of starch applied are regulated so that subsequently after two pieces of the laminated material are brought together in such a way that the rubber surfaces are next to each other and pressure is applied along a narrow area the starch film will be broken and a temporary seal will be formed. This seal may be made and broken a great many times, and this property of the material makes it particularly valuable for the preparation of containers where it is essential to keep the contents in an airtight condition such as in tobacco pouches.

In the preparation of tobacco containers, the material is unrolled and cut into sections of suitable size depending upon the dimensions and shape of the finished container. The material is then folded as shown in Figure 2 and sufficient pressure is applied along the edges 5 or any other area where desired to break the starch film so that the two rubber surfaces along the area at which pressure is applied are practically permanently joined. It has been found convenient to join these edges by means of a rotating knurled wheel. The pressure applied at these areas is much greater than that applied to form a temporary seal.

As indicated above, the ingredients in the rubber composition may be varied to some extent without departing from the spirit of the invention provided the property of forming a temporary seal is not destroyed. While a useful product may be obtained if the rubber is vulcanized and subsequently joined to the transparent film the resulting material could not be temporarily sealed in the manner described above. For this reason, it is preferred to use unvulcanized rubber.

It will be noted that a considerable percentage of filler appears in the formula for the rubber composition. This keeps the finished material adhesive under a great variety of conditions of humidity and temperature whereas if little or no filler were added, the rubber would too readily tend to form a permanent seal. In the claims by the term "filled" I means that the rubber composition so described contains sufficient filler to prevent the composition from forming more than a temporary bond under moderate pressure so that the composition is tacky but not soft and sticky and this tackiness is overcome by a thin surface film of starch.

In describing the laminated material herein disclosed the word "substantial" is intended to mean a layer of rubber composition sufficiently thick so that when a surface layer of starch is applied it will still have enough body to form a temporary seal. We do not intend to cover a layer of rubber composition so thin that the starch layer represents enough of the film to render it non-tacky. It has been found that ordinarily the thinnest practical layer is about 0.003 of an inch. The rubber layer may be as thick as desired; however, I prefer at present to apply layers between 0.003 and 0.012 inch thick since if the layer is thicker than 0.012 inch the cost and weight of the laminated material is greatly increased. The preferred thickness is about 0.006.

Materials produced according to the present invention present an appearance of striking beauty and have the further advantage that they may be prepared at comparatively low cost. In fact, the cost is low enough so that they may be used as the original containers in the retail sale of tobacco and may be discarded when the tobacco is used up and still represent a saving over tin cans.

As many apparently widely different embodiments of this invention may be made without departing from the spirit and scope thereof, it is to be understood that the invention is not limited to the specific embodiments thereof except as defined in the appended claims.

I claim:
1. A laminated material comprising a flexible dense non-fibrous base intimately joined by means of an oil-varnish ink to a substantial layer of uncured rubber composition.

2. Product of claim 1 in which the transparent base is selected from the class consisting of regenerated cellulose, cellulose derivative films, chlorinated rubber, hydrogenated rubber, polymerized rubber, and rubber hydrochloride.

3. An airtight, moistureproof container which comprises a non-fibrous flexible sheet material intimately joined to a substantial layer of filled, uncured rubber composition, a film of an oil-varnish type ink between the said base and said rubber composition for securing them together, and a pair of parallel edges of the said container being permanently welded together by pressure.

4. A flexible laminated material comprising a regenerated cellulose base having a thin film of a varnish consisting essentially of coloring matter and linseed oil, and firmly bonded thereto a substantial layer of a filled, uncured rubber composition.

5. The product of claim 4 in which the varnish has the following approximate composition by weight: coloring matter 39.63%, inseed oil varnish 59.50%, drier 0.87%.

WILLIAM HENRY SHAW.